United States Patent
Moison et al.

(10) Patent No.: US 8,620,119 B2
(45) Date of Patent: Dec. 31, 2013

(54) ARRAY OF WAVEGUIDES MAKING IT POSSIBLE TO DEFLECT A LIGHT BEAM

(75) Inventors: Jean-Marie Moison, Croissy-sur-Seine (FR); Christophe Minot, Paris (FR)

(73) Assignees: Centre National de la Recherche Scientifique—CNRS, Paris (FR); Groupe des Ecoles des Telecommunications—GET, Paris (FR)

( * ) Notice: Subject to any disclaimer, the term of this patent is extended or adjusted under 35 U.S.C. 154(b) by 354 days.

(21) Appl. No.: 12/597,698

(22) PCT Filed: May 5, 2008

(86) PCT No.: PCT/FR2008/000628
§ 371 (c)(1),
(2), (4) Date: Jun. 4, 2010

(87) PCT Pub. No.: WO2008/152229
PCT Pub. Date: Dec. 18, 2008

(65) Prior Publication Data
US 2010/0239206 A1    Sep. 23, 2010

(30) Foreign Application Priority Data
May 4, 2007    (FR) ...................................... 07 54872

(51) Int. Cl.
*G02B 6/26*    (2006.01)
*G02B 6/42*    (2006.01)

(52) U.S. Cl.
USPC .................................. 385/30; 385/28; 385/42

(58) Field of Classification Search
USPC ......................................... 385/27, 28, 30, 42
See application file for complete search history.

(56) References Cited

U.S. PATENT DOCUMENTS 4,792,200 A    12/1988    Amann et al.

FOREIGN PATENT DOCUMENTS

| EP | 0735704 A2 | 10/1996 |
|---|---|---|
| WO | WO-0246837 A2 | 6/2002 |
| WO | WO-2006105175 A1 | 10/2006 |

OTHER PUBLICATIONS

"Optical realization of multilevel adiabatic population transfer in curved waveguide arrays," by Longhi, Physics Letters A, v. 359, pp. 166-170, Jun. 2006.*
"Light propagation in an array of rectilinear and curvilinear coupled channel waveguides," by Goncharov et al, Quantum Electronics, vol. 33, No. 4, pp. 342-348, 2003.*
"Adiabatic three-waveguide directional coupler," by Paspalakis, Optics Communications, v. 258, pp. 30-34 (2006).*
"Adiabatic passage of light in coupled optical waveguides," by Longhi, Physical Review E73, pp. 026607-1 through 026607-5 (2006).*
"Optics in non homogeneous waveguide arrays," by Morandotti et al, Opto-Electronic Review, v. 13, No. 2, pp. 103-106 (2005).*

(Continued)

*Primary Examiner* — Ryan Lepisto
*Assistant Examiner* — Robert Tavlykaev
(74) *Attorney, Agent, or Firm* — Arent Fox LLP

(57) ABSTRACT

The invention relates to an array of waveguides (1) comprising a set of coupled waveguides that are substantially parallel and oriented in a guidance direction (Y), the set of waveguides comprising a first zone (2) formed by waveguides coupled according to a first coupling coefficient, and a second zone (3) formed by waveguides coupled according to a second coupling coefficient that is different from the first coupling coefficient, characterized in that the second coupling coefficient is different from the first coupling coefficient in the guidance direction and in the direction (X) perpendicular to the guidance direction.

10 Claims, 6 Drawing Sheets

(56) References Cited

OTHER PUBLICATIONS

"Exact dynamic localization in curved AlGaAs optical waveguide arrays," by Iyer et al, Optics Express, vol. 15, No. 6, pp. 3212-3222, Mar. 19, 2007.*

"Optical filters based on dynamic localization in curved coupled optical waveguides," by Wan et al, Optics Communications, vol. 247, pp. 353-365 (2005).*

"Diffraction management," by Eisenberg et al, Physical Review Letters, vol. 85, No. 9, pp. 1863-1866 (2000).*

"Optical modes at the interface between two dissimilar discrete metamaterials," by Suntsov et al, Optics Express, vol. 15, No. 8, pp. 4663-4670, Apr. 16, 2007.*

Locatelli A. et al.: "Discrete Negative Refraction in Photonic Crystal Waveguide Arrays"; Optics Letters; OSA; Optical Society of America; Washington DC; US; vol. 31, No. 9; May 1, 2006; pp. 1343-1345; XP001242657; ISSN: 0146-9592.

Matsumoto M. et al.; "Optical Switching in Nonlinear Waveguide Arrays with a Longitudinally Decreasing Coupling Coefficient"; Optics Letters; OSA; Optical Society of America; Washington, DC, US; vol. 20; No. 17; Sep. 1, 1995; pp. 1758-1760; XP000520895; ISSN: 0146-9592.

Krolikowski W. et al.; "Soliton-based optical switching in waveguide arrays"; Journal of the Optical Society of America—B, Optical Society of America; Washington; US, vol. 13; No. 5; May 1996; pp. 876-887; XP002208606; ISSN: 0740-3224.

* cited by examiner

ARRAY OF WAVEGUIDES MAKING IT POSSIBLE TO DEFLECT A LIGHT BEAM

CROSS-REFERENCE TO RELATED APPLICATION

This application is a National Stage entry of International Application No. PCT/FR2008/000628, filed May 5, 2008, the disclosure of the prior application is hereby incorporated in its entirety by reference.

The invention relates to the field of coupled arrays of waveguides and more particularly to an array of waveguides including a set of coupled waveguides substantially parallel and oriented in a guidance direction, with the set of waveguides including a first zone formed of coupled waveguides according to a first coupling coefficient.

Such arrays of waveguides are for example disclosed in the publication "Spatial photonics in nonlinear waveguide arrays", Fleischer and al., Optics express Vol. 13, No. 6, 2005. In this publication, the waveguides of the array are coupled uniformly in the array. The uniformity of the coupling within the array is obtained because two adjacent waveguides are coupled according to the same coefficient of coupling in the array.

It is known that a light beam can propagate in a guided way in such arrays of waveguides. The light beam propagating in such an array is called "Floquet-Bloch wave" or "supermode" or "Schrödinger discrete modes" depending on the authors.

The guidance of the light beams in the array of coupled waveguides is particularly advantageous more particularly in the field of telecommunications.

In such an array of coupled waveguides, the light beam in principle propagates linearly or with a natural divergence.

Now and more particularly in the field of commutation components for optical telecommunications, it is advantageous that a light beam can be oriented, reflected or focused.

Therefore, several solutions have been considered.

First, it is possible to have the light beam go out the array of waveguides and orient the beam by known mechanical means such as mirrors or by dioptres or lens.

However, this solution has the drawback of having to be implemented out of the waveguides arrays so that the guidance of the light beam is lost. The integration of the component including the arrays of waveguides is thus not very efficient.

In order to deflect statically a beam in an array of waveguides, it is known from the publication "Approximate solution of Eigenmode Problems for coupled waveguide Arrays", Richard R. A. Syms, IEEE Journal of quantum electronics, 1987, an array of waveguides including a set of coupled parallel waveguides oriented in a guidance direction, the set of waveguides including a first zone formed of waveguides coupled according to a first coupling coefficient and including a second zone formed of waveguides coupled according to a second coupling coefficient that is different from the first coupling coefficient.

In this publication, a zone of the array is formed of two to three guide bands coupled according to a coupling coefficient that is different from the rest of the array, so that it is possible to confine a light beam in this zone of the array.

In the publication, the waveguides are parallel and oriented in a guidance direction. Let us assume that Y is this direction and X the perpendicular direction, the coupling coefficient varies at the level of the coupling zone which is different in the direction X, but the coupling coefficient is constant in the direction Y corresponding to the guidance direction.

Then, a light beam totally oriented in the guidance direction Y is not deflected and is not affected by the coupling difference in the perpendicular direction X.

The possibilities of deflecting the light beam are thus limited with the waveguide array of the above-mentioned publication.

On the contrary, an array of waveguides wherein the waveguides are parallel and oriented in a guidance direction is also known from the Locatelli and al. publication "Discrete negative refraction in photonic crystal waveguide arrays", Optics Letters 2006. Let us assume, as previously, that Y is this direction and X the perpendicular direction, this time the coupling coefficient varies at the level of the coupling zone in the direction Y, but the coupling coefficient is constant in the direction X corresponding to the direction perpendicular to the guidance direction.

With such a variation in the coupling coefficient in the direction Y only, the deflection along the direction Y is difficult and requires a heavy and little adaptable construction.

The invention aims at improving the possibility of deflecting a light beam in an array of waveguides.

This purpose is reached by the invention thanks to the fact that the second coupling coefficient is different from the first coupling coefficient in the guidance direction and in the direction perpendicular to the guidance direction.

Then according to the invention, the array of waveguides can be arranged so as to deflect any type of light beam whatever the incidence direction in the array of waveguides.

In addition, thanks to the variation in the coupling coefficient both along X and Y, it is possible to supply a great number of shapes to the second array having the second coupling coefficient so as to precisely control the deflection of a light beam.

The invention is not a simple juxtaposition of arrays independently assembled. On the contrary, according to the invention, the first array is in contact with the second array and the coupling coefficient of the waveguides which are coupled varies at the interface between the first zone and the second zone in the guidance direction and in the direction perpendicular to the guidance direction. Numerous deflections of the beam are then possible when passing through this interface.

Advantageous embodiments of the invention are disclosed in the sub-claims.

More particularly, the second zone can be arranged so as to make a light beam converge or diverge in the array of waveguides.

In addition, at least one coupling coefficient selected among the second coupling coefficient or the first coupling coefficient can vary as a function of an external parameter.

Then, the deflection properties of the array of waveguides of the invention can vary dynamically.

For example, at least one coupling coefficient selected among the second coupling coefficient or the first coupling coefficient can vary as a function of the wavelength of a beam entering the array of waveguides.

In addition, the second zone can be so arranged as to deflect a light beam in the array of waveguides.

In addition, the array of waveguides mentioned above may include a gain zone arranged to amplify a light beam in the array of waveguides.

The second array can have a curved interface with the first zone, which means a non rectilinear interface. According to the invention, various shapes can be given to the second zone by varying this curvature, so that it behaves like various dioptres so as to deflect the light beam according to the required characteristics.

For example, the interface between the second zone and the first zone can have an elliptic or a parabolic shape. Other curved shapes may be considered.

The invention also relates to the utilization of an array of waveguides such as previously described to deflect a light beam in the array of waveguides.

Now, embodiments of the invention will be described while referring to the appended figures wherein.

Figure 1:
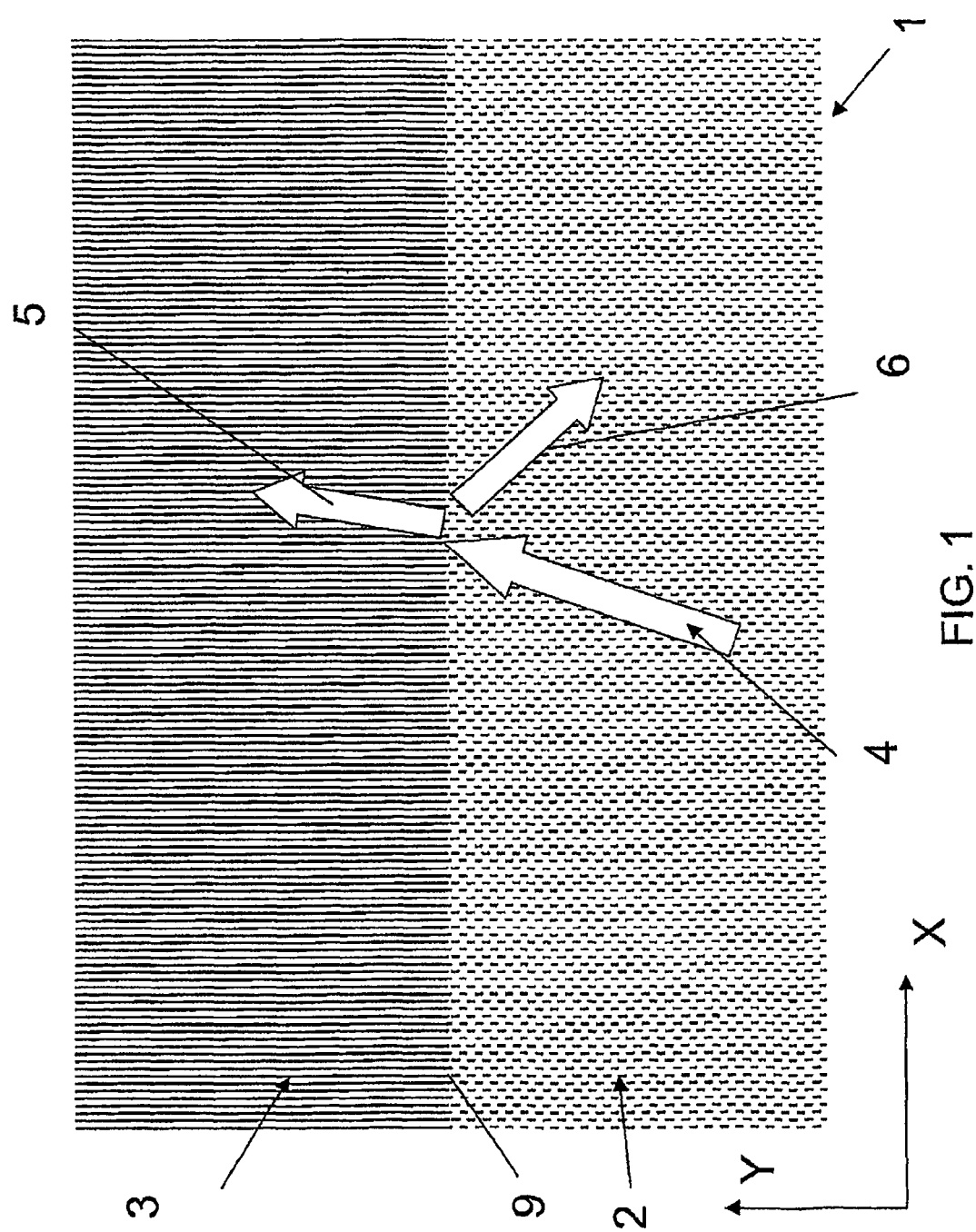
FIG. 1 shows an array of waveguides of the known type.
Figure 5:
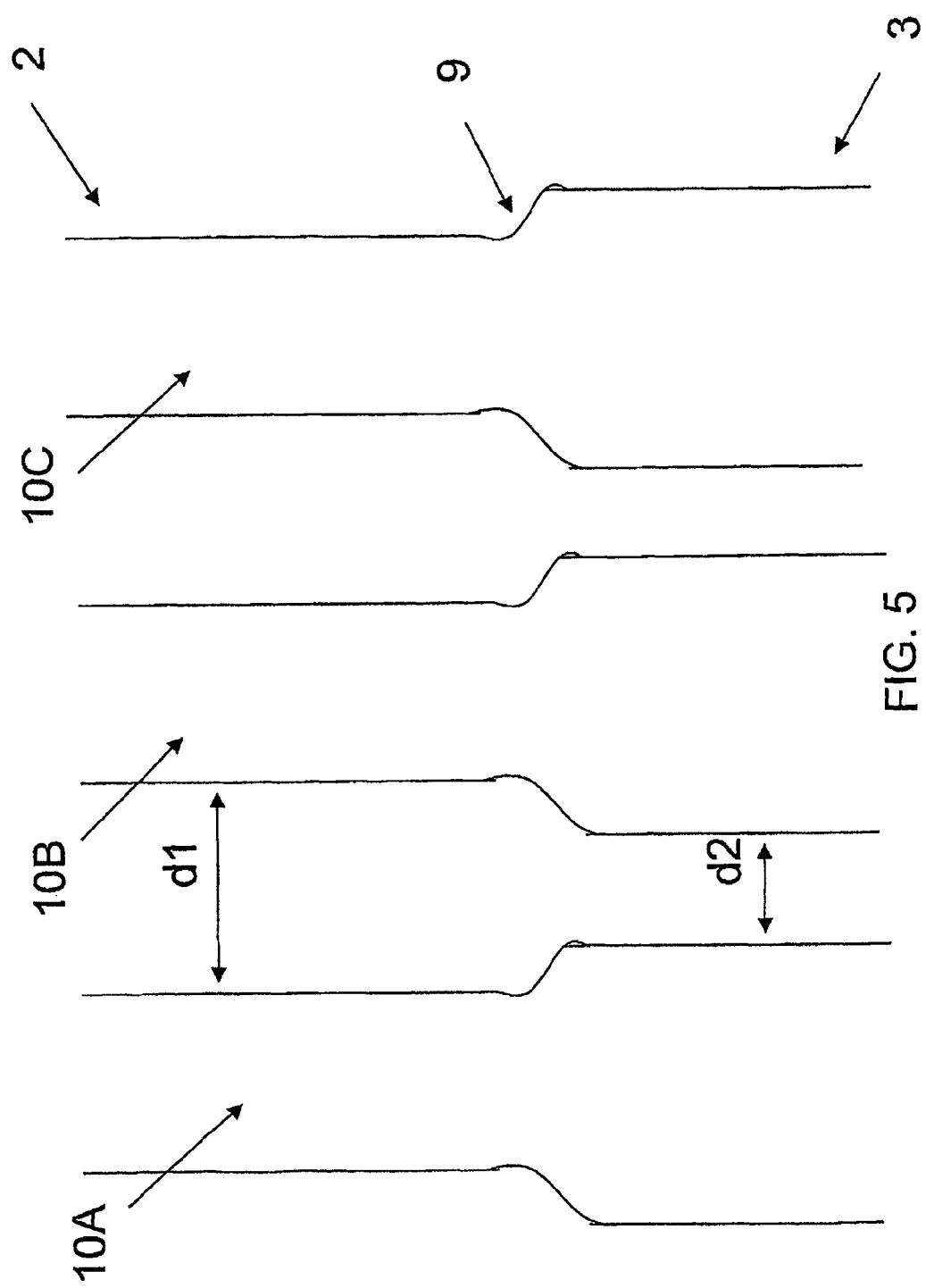

FIG. 5 schematically illustrates an interface between a first zone and a second zone in the embodiment of FIG. 1.

Figure 2:
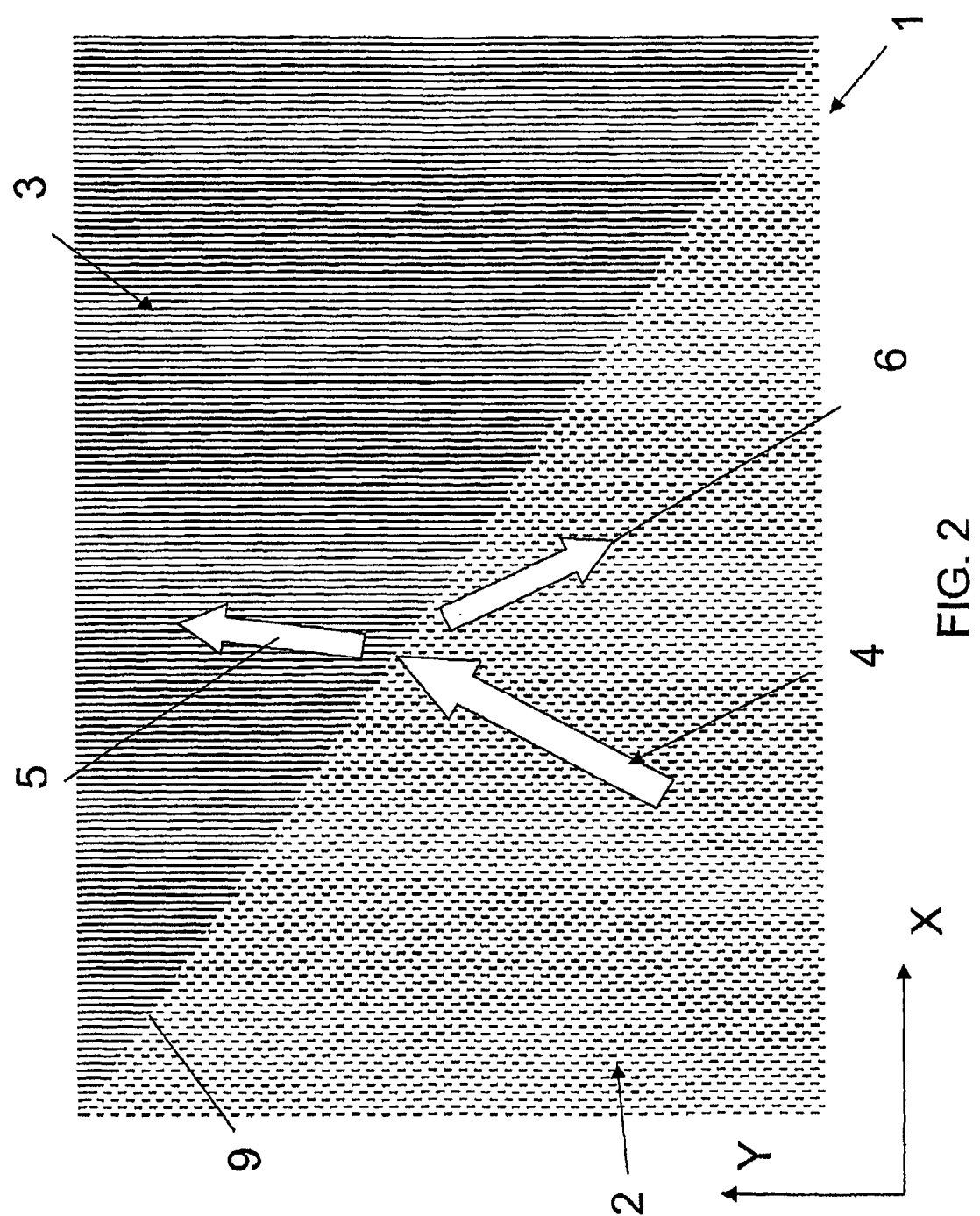
FIG. 2 shows an array of waveguides according to a first embodiment of the invention.
Figure 6:
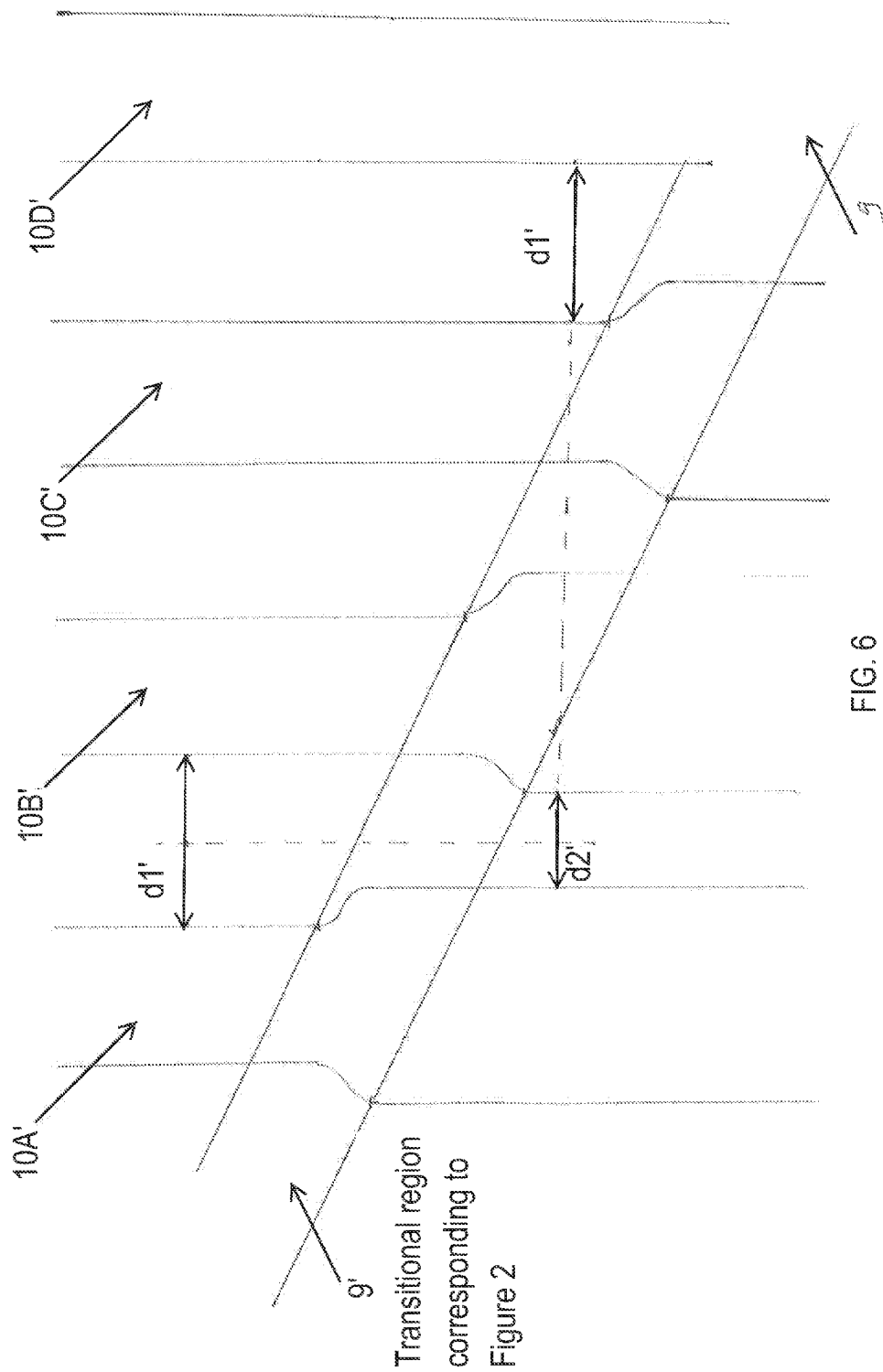

FIG. 6 schematically illustrates an interface between a first zone and a second zone as in FIG. 2.

In a way known per se, as illustrated in FIG. 1, an array of waveguides 1 includes coupled waveguides parallel and oriented according to a guidance direction Y. The direction perpendicular to the guidance direction Y is indicated by X.

Separately, the waveguides of the array of waveguides 1 are for example monomode waveguides. The size of the mode is determined so as to be compatible with the optical components making it possible to bring or to let out the light in the waveguide 1. In a way known per se, for an array of waveguides, the width of the mesa is thus determined as well as the stack of layers for the separate waveguides of the array of waveguides.

The array of waveguides 1 includes a first zone of coupled waveguides 2 and a second zone of coupled waveguides 3. It should be noted that in the array 1, the same waveguides extend on the whole length of the array in the guidance direction Y, but the coupling coefficients in this direction Y vary. A common interface 9 between the zones 2 and 3 of the array 1 can be defined.

The first zone 2 includes weakly coupled guides with respect to the guides of the second zone 3 which are strongly coupled. Let $C_1$ be the coupling coefficient of the guides of the first zone 2 and $C_2$ the coupling coefficient of the guides of the second zone 3, for example $C_2 = 2 \cdot C_1$ is selected. These coefficients can for example be coefficients reduced with respect to a reference coefficient for the two zones.

With such a coupling coefficient ratio, when a light beam 4 arrives at the interface 9 between the first zone 2 and the second zone 3, it is reflected into a reflected beam 5 and refracted into a refracted beam 6 and this is true even though the light beam 4 is oriented in the direction Y.

To obtain the coupling difference between the strong coupling zone 3 and the weak coupling zone 2, the persons skilled in the art can use several methods known per se when the problem is to define a constant coupling coefficient in an array of guides in the state of the art.

More particularly, grooves can be dug between the waveguides according to patterns defined by an etching mask reproducing the heterostructure desired for the array of waveguides. In this case, etching must be all the deeper as it is desired to locally lower the coupling coefficient.

The calculation of the etching required to obtain the desired coefficient can be carried out by a digital simulation known as the "Beam Propagation Method" in English. In another way also known per se, further to the etching, tests are made to check that the array really corresponds to the desired structure.

To design separate guides, the persons skilled in the art can use several methods known per se. More particularly, they can use the so-called "shallow ridge" structure with semiconductors III-V. An example thereof is described in details in the publication "Diffraction management" by H. S. Eisenberg, Y. Silverberg, R. Morandotti, and J. S. Aitchison, Physical Review Letters vol. 85/9, p. 1863-1866 (2000). For this particular structure designed for being operated at 1.55 μm, the coupling coefficient is 0.15 mm$^{-1}$.

Now, a first embodiment of the invention will be described while referring to FIG. 2, wherein the second coupling coefficient C2 of the second zone 3 is, in addition, different from the first coupling coefficient C1 of the first zone 2 in the direction X perpendicular to the guidance direction Y.

The array of waveguides 1 includes an oblique interface 9 defined by the limit between the first zone 2 and the second zone 3.

In operation, when a light beam 4 propagates in the first zone 2 and reaches the oblique interface 9 with a second zone 3, it is reflected into a reflected beam 5 and refracted into a refracted beam 6. The incident beam for example has a limited extension but it is wide enough for the direction thereof to be well defined. The characteristic width of the beam is for example equal to ten distances between the guides. The refraction and reflection directions depend on the direction of the oblique interface 9 and the direction of the incident beam 4.

Figure 3:
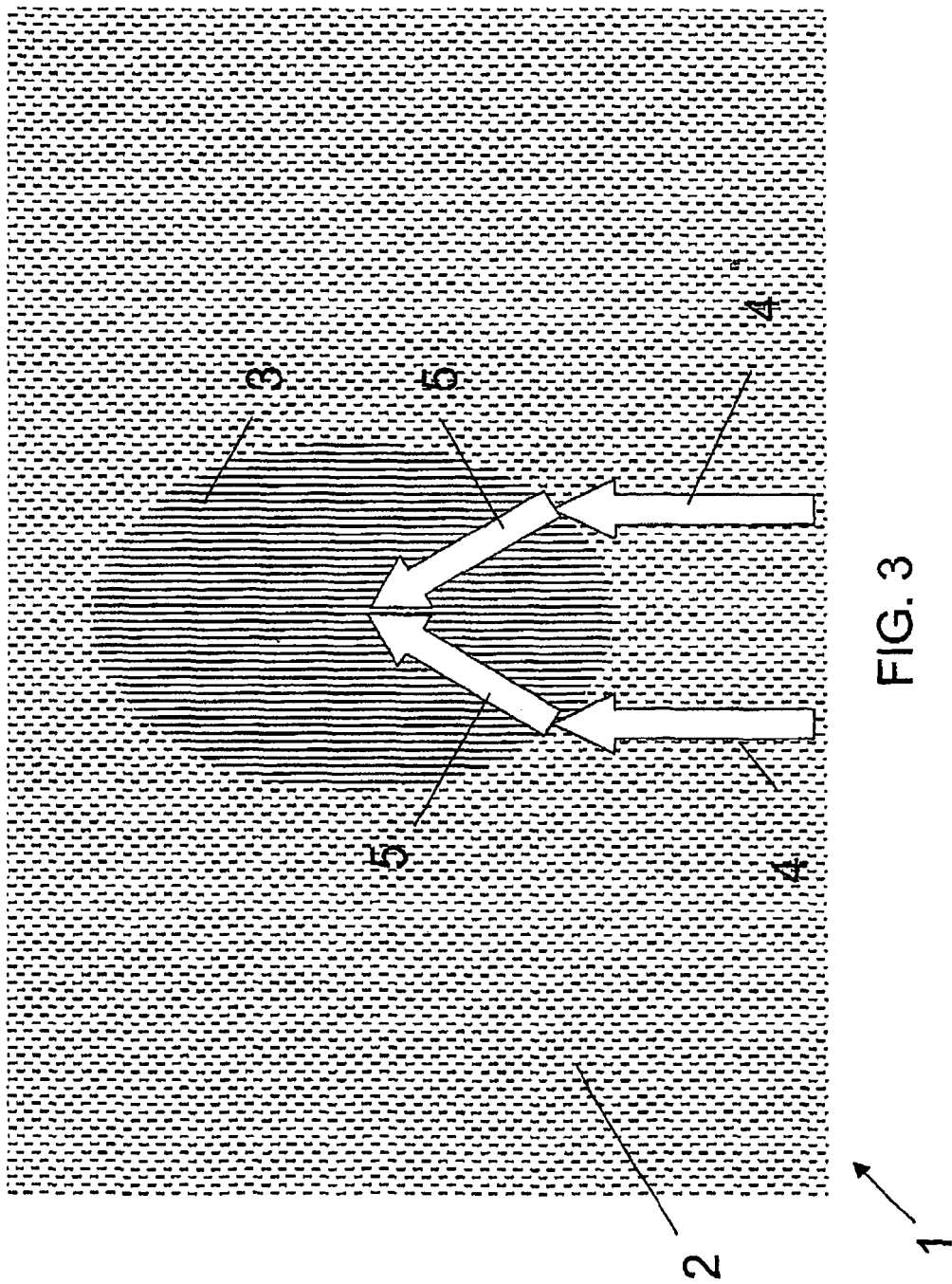
FIG. 3 shows an array of waveguides according to a second embodiment of the invention.

In reference to FIG. 3, according to a second embodiment, the array of waveguides 1 includes a first zone 2 comprising guides coupled according to a coupling coefficient C1 and a second zone 3 comprising guides coupled according to a coefficient C2, with for example $C2 = 2 \cdot C1$.

The second zone 3 is limited by an interface 9 having an elliptic form so that the coupling coefficient C2 is different from the first coupling coefficient C1 of the first zone 2 in the guidance direction Y and in the direction X perpendicular to the guidance direction Y.

It has been demonstrated that this second zone 3 delimited by an ellipse behaves like an elliptic dioptre so that, when a light beam is transmitted to the zone 3, the beam is focused. The focal distance of such a dioptre can be calculated according to formulas equivalent to Snell-Descartes formulas for the arrays of waveguides. These formulas explain the preservation of energy when passing into the different coupling coefficient zone.

In operation, in FIG. 3, a light beam 4 propagates in the first zone 2 for example in the guidance direction Y. This beam goes through the second zone 3 and focuses in the zone 3 into a light beam 5. The variation in the parameters of the elliptic delimiting the second zone 3 makes it possible to vary the focusing of the light beam 5.

Figure 4:
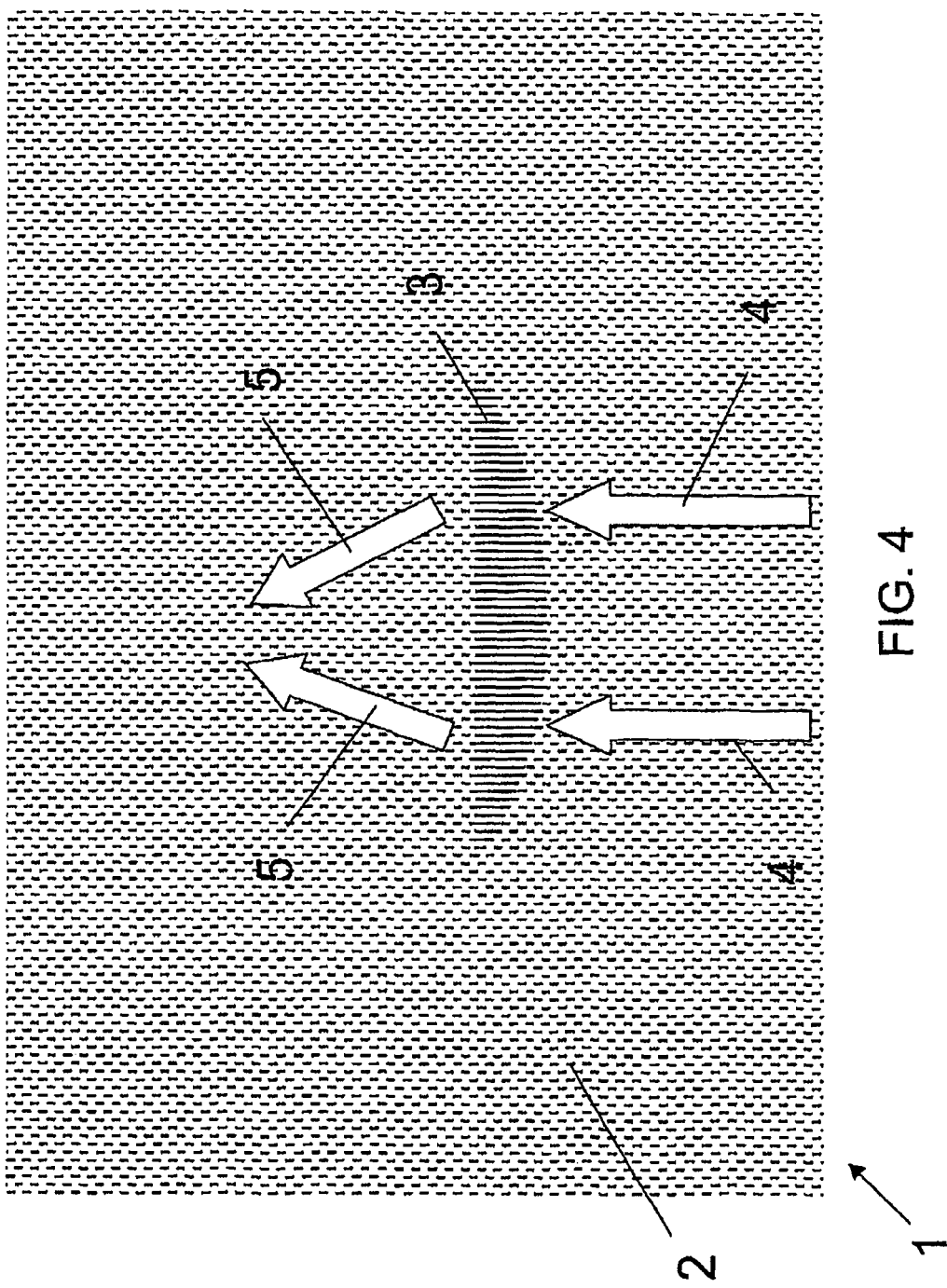
FIG. 4 shows an array of waveguides according to a third embodiment of the invention.

FIG. 4 illustrates another form for the second zone 3.

In FIG. 4, the array of waveguides 1 includes a first zone 2 including waveguides coupled according to a coupling coefficient C1 and a second zone 3 comprising waveguides coupled according to a coupling coefficient C2.

The second zone 3 is defined by a plane-convex zone like for conventional lens. The coupling coefficient C2 is different from the first coupling coefficient C1 of the first zone 2 in the guidance direction Y and in the direction X perpendicular to the guidance direction Y.

In operation, a light beam 4 propagates in the first zone 2 in the guidance direction Y. This beam goes through the second zone 3 and focuses thanks to zone 3 into a light beam. The variation of the parameters in the plane-concave zone and more particularly the variations in concavity delimiting the second zone 3 make it possible to vary the focusing of the light beam 5.

Other forms for the second zone 3 may of course be considered. In order to enable a correct control of the path of the light beams, these forms are such that the coupling coefficient C2 of the second zone 3 is different from the first coupling coefficient C1 of the first zone 2 in the guidance direction Y and possibly in the direction X perpendicular to the guidance direction Y. More particularly, the interface between the second zone 3 and the first zone 2 can be convoluted so as to have the light beam follow a determined path.

In the array of waveguides 1 according to the invention, the coefficients C1 and C2 are determined as a function of the deflection characteristics expected for the light beam 4 which is incident at the level of the second zone 3.

The variation in the coupling coefficient is for example obtained by varying the distance d between the waveguides in the guidance direction and in the direction perpendicular to this guidance direction. Then, a function C(d) corresponding to the coupling coefficient is defined between two waveguides, as a function of the distance between the waveguides.

This coupling coefficient depends on the overlap of the modes of the separate guides. This overlap of the modes having a quasi-exponential form, the function C(d) is then also a quasi-exponential decreasing function. It is then possible to obtain significant variations in the coupling coefficient with the small variation in the distance between the waveguides.

As mentioned hereabove, it is possible in all the embodiments, to dig grooves between the waveguides according to patterns defined by an etching mask reproducing a heterostructure desired for the guide waves. In this case, the etching must be all the deeper as it is desired to locally lower the coupling coefficient.

FIG. 5 schematically illustrates an interface 9 between the first zone 2 and the second zone 3 in the above-mentioned embodiments, while considering separate waveguides 10A, 10B, 10C.

In the weak coupling zone 2, the waveguides 10A, 10B and 10C are separated by a distance d1. At the level of the interface 9, the distance between the waveguides 10A, 10B and 10C has been modified for example by etching. In the strong coupling zone 3, the waveguides 10A, 10B and 10C are separated by a distance d2 smaller than d1 which makes it possible to obtain a coupling C2 between the waveguides and the second zone 3 which is greater than the coupling C1 between the waveguides in the first zone 2.

FIG. 6 schematically illustrates an interface, or transitional region, 9' between the first zone and the second zone as in FIG. 2. In the first zone, the waveguides 10A', 10B1', 10C', 10D' are separated by a distance d1'. In the second zone, the waveguides are separated by a distance d2'.

Using a propagation modelling software makes it possible to determine the distribution of guides as a function of the function requested for the waveguide array.

Now alternate solutions to the invention will be described.

In the above-mentioned embodiments, the difference in the coupling coefficient in the guidance direction is fixed and is not affected by external parameters.

According to an alternative solution, the coupling coefficients of the first zone 2 or of the second zone 3 are modulated as a function of an external parameter such as electric voltage, temperature, mechanical stress, optical pumping or the wavelength of the beam.

Thus, if the coupling coefficients depend on the wavelength of the beam, the array of waveguides 1 can be used as a wavelength selector, multiplexer or demultiplexer.

In addition, the array of waveguides 1 can include a third gain zone so as to amplify the beam propagating in the array. According to this alternative solution, it is possible to deflect the beam while amplifying it. It is then possible to form a resonator to obtain a laser type effect.

In addition, the array of waveguides 1 can include waveguides capable of guiding other types of waves than optical waves. Then, it can be able to deflect ultra-high frequencies, ultrasounds or sounds.

The array of waveguides 1 can also be a bi-dimensional array of waveguides.

The invention claimed is:

1. An array of waveguides comprising a set of coupled waveguides having a longitudinal axis that are substantially parallel and oriented in a guidance direction, the set of waveguides comprising:
   a first zone in which the coupled waveguides are coupled according to a first coupling coefficient that is constant over the first zone;
   a second zone in which the coupled waveguides are coupled according to a second coupling coefficient that is constant over the second zone and that is different from the first coupling coefficient; and
   a transitional region located between the first zone and the second zone, wherein a transition between the first coupling coefficient and the second coupling coefficient of the coupled waveguides occurs in both the guidance direction and a direction perpendicular to the guidance direction only within the transitional region.

2. An array of waveguides according to claim 1, wherein the second zone is arranged to make a light beam converge or diverge in the array of waveguides.

3. An array of waveguides according to claim 1, wherein at least one of the second coupling coefficient and the first coupling coefficient varies as a function of an external parameter.

4. An array of waveguides according to claim 3, wherein at least one of the second coupling coefficient and the first coupling coefficient varies as a function of the wavelength of a beam going into the array of waveguides.

5. An array of waveguides according to claim 1, wherein the second zone is so arranged as to deflect a light beam in the array of waveguides.

6. An array of waveguides according to claim 1, comprising a gain array so arranged as to amplify a light beam in the array of waveguides.

7. An array of waveguides according to claim 1, wherein the interface transitional region is curved.

8. An array of waveguides according to claim 1, wherein the interface transitional region has an elliptic or a parabolic shape.

9. A method of propagating light in a comprising:
   deflecting a light beam in a set of coupled waveguides that are substantially parallel and oriented in a guidance direction, wherein the set of waveguides include:
   a first zone in which the coupled waveguides are coupled according to a first coupling coefficient that is constant over the first zone;
   a second zone in which the coupled waveguides are coupled according to a second coupling coefficient that is constant over the second zone and that is different from the first coupling coefficient; and
   a transitional region located between the first zone and the second zone, wherein a transition between the first coupling coefficient and the second coupling coefficient of the coupled waveguides occurs in both the guidance direction and a direction perpendicular to the guidance direction only within the transitional region.

10. An array of waveguides according to claim 7, wherein the interface transitional region between the second zone and the first zone has an elliptic or a parabolic shape.

* * * * *